US009341367B2

(12) United States Patent
Hur et al.

(10) Patent No.: US 9,341,367 B2
(45) Date of Patent: May 17, 2016

(54) TUBE SHEET OF STEAM GENERATOR HAVING ANTICORROSIVE LAYER AND MANUFACTURING METHOD THEREOF

(71) Applicants: KOREA HYDRO & NUCLEAR POWER CO., LTD., Seoul (KR); KOREA ATOMIC ENERGY RESEARCH INSTITUTE, Daejeon (KR)

(72) Inventors: Do-Haeng Hur, Daejeon (KR); Myung-Sik Choi, Daejeon (KR); Deok-Hyun Lee, Daejeon (KR); Kyung-Mo Kim, Daejeon (KR); Jung-Ho Han, Yeongi-gun (KR)

(73) Assignees: KOREA HYDRO & NUCLEAR POWER CO., LTD. (KR); KOREA ATOMIC ENERGY RESEARCH INSTITUTE (KR)

( * ) Notice: Subject to any disclaimer, the term of this patent is extended or adjusted under 35 U.S.C. 154(b) by 442 days.

(21) Appl. No.: 13/837,920

(22) Filed: Mar. 15, 2013

(65) Prior Publication Data

US 2014/0048020 A1     Feb. 20, 2014

(30) Foreign Application Priority Data

Aug. 20, 2012  (KR) .......................... 10-2012-0090793

(51) Int. Cl.
*F22B 37/24* (2006.01)
*F22B 37/00* (2006.01)

(52) U.S. Cl.
CPC ............... *F22B 37/24* (2013.01); *F22B 37/002* (2013.01)

(58) Field of Classification Search
CPC ....... F22B 37/24; F22B 37/242; F22B 37/002
USPC ............... 122/512, 511, 510; 165/134.1, 158, 165/178, 173; 285/422, 424; 29/17.3
See application file for complete search history.

(56) References Cited

U.S. PATENT DOCUMENTS

| 3,182,720 | A | * | 5/1965 | Brown ......................... 165/158 |
| 4,288,109 | A | * | 9/1981 | Ellis ........................... 285/141.1 |
| 4,579,171 | A | * | 4/1986 | Stafford et al. ............... 165/115 |
| 4,749,117 | A | * | 6/1988 | Noe et al. ...................... 228/107 |
| 4,981,527 | A | * | 1/1991 | Charquet ....................... 148/672 |
| 5,088,451 | A |   | 2/1992 | Hu et al. |
| 8,210,245 | B2 | * | 7/2012 | Gillessen et al. .......... 165/134.1 |

FOREIGN PATENT DOCUMENTS

| CN | 201040760 | 3/2008 |
| JP | 63213639 | 9/1988 |
| JP | 2002257492 | 9/2002 |
| JP | 2003073736 | 3/2003 |
| KR | 1020020075525 | 10/2002 |
| KR | 1020050007950 | 1/2005 |
| KR | 1020080067919 | 7/2008 |
| KR | 1020080098890 | 11/2008 |

\* cited by examiner

*Primary Examiner* — Alissa Tompkins
*Assistant Examiner* — Benjamin W Johnson
(74) *Attorney, Agent, or Firm* — Cantor Colburn LLP

(57) ABSTRACT

Provided are a tube sheet of a steam generator installed to support a tube of the steam generator, and a manufacturing method thereof, particularly, a tube sheet of a steam generator having an anticorrosive layer and a manufacturing method thereof.

9 Claims, 9 Drawing Sheets

TUBE SHEET OF STEAM GENERATOR HAVING ANTICORROSIVE LAYER AND MANUFACTURING METHOD THEREOF

CROSS-REFERENCE TO RELATED APPLICATIONS

This application claims priority under 35 U.S.C. §119 to Korean Patent Application No. 10-2012-0090793, filed on Aug. 20, 2012, in the Korean Intellectual Property Office, the disclosure of which is incorporated herein by reference in its entirety.

TECHNICAL FIELD

The following disclosure relates to a tube sheet of a steam generator including an anticorrosive layer for preventing corrosion of a tube sheet of a nuclear power plant steam generator and denting of a tube, and a manufacturing method thereof.

BACKGROUND

Nuclear power generation uses heat generated by a nuclear fission reaction of nuclear fuel in a reactor pressure vessel. The heat generated by the nuclear fission reaction is transferred to a primary side circulated between a fuel assembly and a steam generator. Heated water of the primary side transfers heat from the steam generator to a secondary side, and steam generated as a result of the heat transfer operates a turbine generator. After a temperature of the secondary side passing through the turbine is decreased in a condenser, the secondary side water again enters the steam generator.

In this case, cooling water flowing in the primary side, that is, water circulated between a nuclear reactor and the steam generator is called primary cooling water, and cooling water flowing in the secondary side is called secondary cooling water.

A tube sheet 100 included in the steam generator operated in a nuclear power plant is a support plate expanding and fixing a tube 200 and is made of a low-alloy steel material.

The primary cooling water flows inside the tube 200 and the secondary cooling water flows outside the tube 200.

Referring to FIG. 1, a surface of a secondary tube sheet in contact with the secondary cooling water is oxidized to magnetite by a corrosion reaction, such that a volume thereof is expanded. In this process, an outer surface of the tube 200 adjacent to the oxidized surface is pressed in an inner diameter direction, such that a shape thereof is changed. This phenomenon is called denting. When the denting is generated, stress is applied to the tube 200, such that a stress corrosion crack of the tube 200 is easily generated.

In the case in which the crack is generated in the tube 200, the primary cooling water flowing inside the tube 200 is leaked to the outside of the tube 200. The primary cooling water includes metal ions or metal oxides such as cobalt, nickel, iron, or the like, dissolved from a surface of a material that it contacts. These metal ions and metal oxides are activated in the nuclear reactor core. Therefore, the activated primary cooling water is leaked to the outside of the tube 200 to thereby be discharged to the outside of the steam generator together with the secondary cooling water.

As an existing method for suppressing denting, a water chemistry control method of maintaining quality of secondary cooling water to be neutral and a lancing and chemical cleaning method of removing sludge 40 accumulated on the tube sheet have been applied. However, the denting phenomenon has been continuously generated.

In addition, Korean Patent Laid-Open Publication No. 2005-0007950, which relates to a method of preventing corrosion of a tube sheet 100 of a steam generator, has disclosed a configuration of reinforcement-welding the tube sheet 100 using a strip made of a strong anticorrosive material. However, the reinforcement-welding is performed after forming a tube mounting hole 30, and the tube mounting hole 30 is again formed after cladding-welding. In addition, the reinforcement-welding is performed up to an inner portion of the tube sheet 100.

RELATED ART DOCUMENT

Patent Document (Patent Document 1) Korean Patent Laid-Open Publication No. 2005-007950

SUMMARY

An embodiment of the present invention is directed to providing a tube sheet of a steam generator capable of preventing denting of a tube due to corrosion by cladding a both primary and secondary tube sheet surface of a tube sheet of a nuclear power plant steam generator with an anticorrosive metal, and a manufacturing method thereof.

Another embodiment of the present invention is directed to providing a tube sheet of a steam generator capable of improving soundness of a cladding layer by cladding a surface of the tube sheet and then heat-treating the surface at an appropriate temperature to remove residual stress caused by cladding process, and a manufacturing method thereof.

Still another embodiment of the present invention is directed to providing a tube sheet of a steam generator capable of minimizing sludge attachment by polishing a secondary tube sheet surface after or before drilling a tube mounting hole, and a manufacturing method thereof.

Still another embodiment of the present invention is directed to providing a tube sheet of a steam generator capable of improving straightness of a tube mounting hole and precision of a processing dimension and decreasing a manufacturing time and a manufacturing cost by forming the tube mounting hole at a time after cladding a primary tube sheet surface and a secondary tube sheet surface with an anticorrosive metal, and a manufacturing method thereof.

In one general aspect, a tube sheet of a steam generator having an anticorrosive layer, includes: a tube sheet of a steam generator installed so as to support a tube of the steam generator; and an anticorrosive metal cladding on a primary tube sheet surface and a secondary tube sheet surface.

In another general aspect, a manufacturing method of a tube sheet of a steam generator having an anticorrosive layer and installed to support a tube of the steam generator, includes: cladding a primary tube sheet surface and a secondary tube sheet surface with an anticorrosive metal; heat-treating the tube sheet of a steam generator cladded with the anticorrosive metal; and drilling a tube mounting hole in the heat-treated tube sheet of a steam generator.

DETAILED DESCRIPTION OF MAIN ELEMENTS

Figure 1:
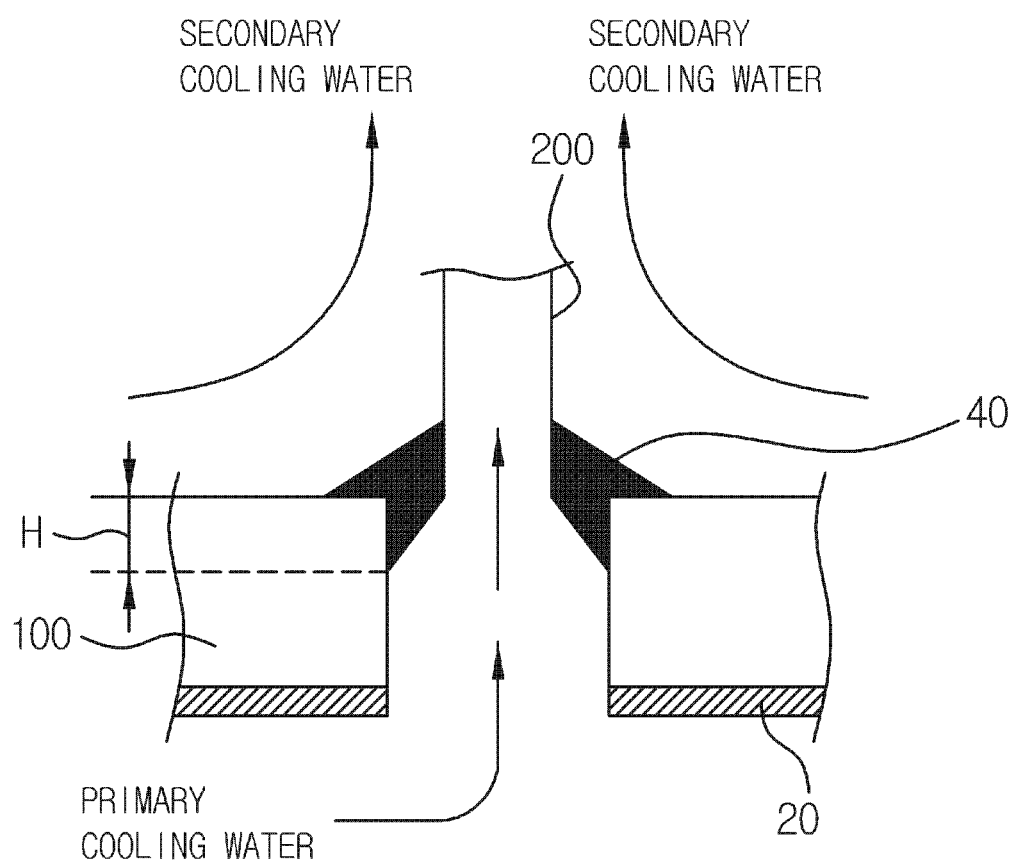
FIG. 1 is a cross-sectional view showing a tube sheet of a steam generator manufactured according to the related art in which a tube is mounted.

100: Tube sheet of steam generator
11: Primary tube sheet surface
12: Secondary tube sheet surface
20: Anticorrosive metal
30: Tube mounting hole
40: Sludge
200: Tube
D: Thickness of anticorrosive metal cladding secondary tube sheet surface
H: Depth of gap of tube expanding part

DETAILED DESCRIPTION OF EMBODIMENTS

A configuration and an acting of the present invention will be described in detail with reference to the accompanying drawings.

A tube sheet 100 of a steam generator having an anticorrosive layer according to an exemplary embodiment of the present invention is configured to include a tube sheet 100 of a steam generator installed so as to support a tube 200 of the steam generator; and an anticorrosive metal 20 cladding a primary tube sheet surface 11 and a secondary tube sheet surface 12. The anticorrosive metal 20 is a metal or an alloy having a corrosion rate lower than that of a material of the tube sheet 100 of a steam generator, preferably, includes at least one of stainless steel (STS), Alloy 600, and Alloy 690.

Figure 2:
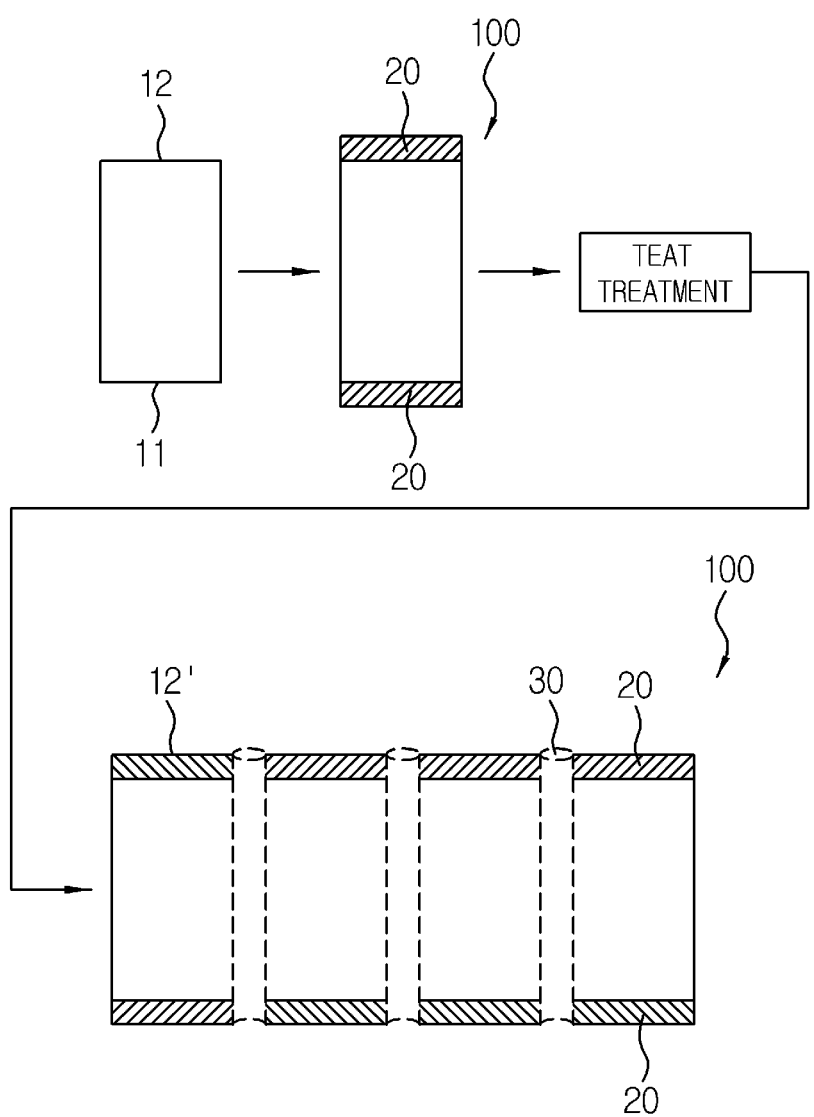
FIG. 2 is a conceptual diagram of a manufacturing method of a tube sheet of a steam generator according to an exemplary embodiment of the present invention.
Figure 3:
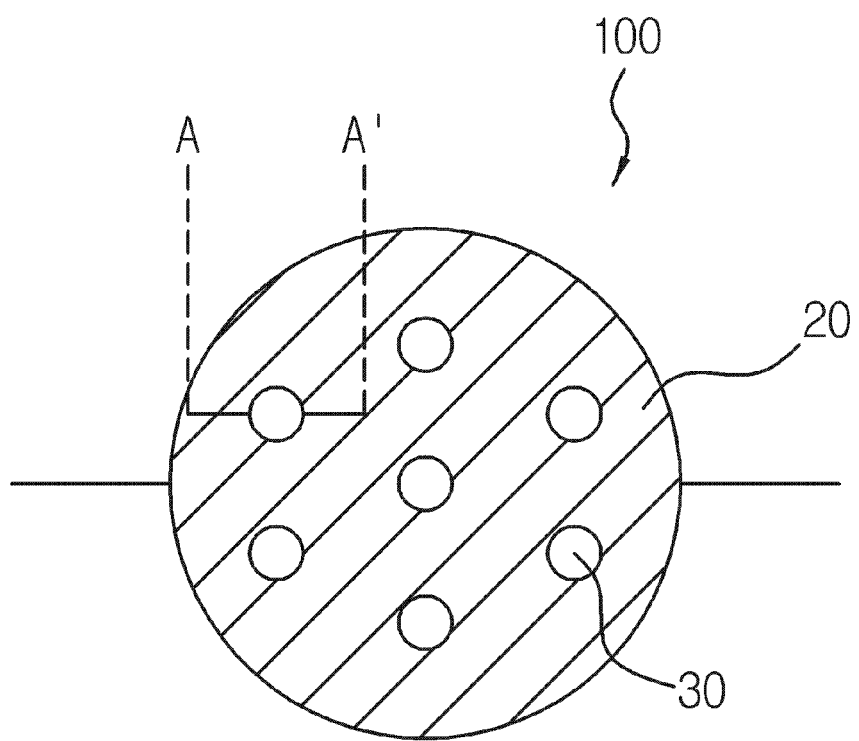
FIG. 3 is a plan view of a tube sheet of a steam generator manufactured by the manufacturing method of a tube sheet of a steam generator according to the exemplary embodiment of the present invention.

A manufacturing method of the tube sheet 100 of a steam generator installed to support the tube 200 of the steam generator will be described with reference to FIG. 2. The manufacturing method of the tube sheet 100 of a steam generator having an anticorrosive layer according to the exemplary embodiment of the present invention includes providing the tube sheet 100 of a steam generator having a predetermined thickness, cladding the primary tube sheet surface 11 and the secondary tube sheet surface 12 with the anticorrosive metal 20, heat-treating the tube sheet 100 of a steam generator cladded with the anticorrosive metal 20, and drilling a tube mounting hole 30 in the heat-treated tube sheet 100 of a steam generator.

The manufacturing method of the tube sheet 100 of a steam generator having an anticorrosive layer according to the exemplary embodiment of the present invention includes preparing the tube sheet 100 of a steam generator having a predetermined thickness and cladding the primary tube sheet surface 11 and the secondary tube sheet surface 12 of the tube sheet 100 of a steam generator with the anticorrosive metal 20 having a predetermined thickness. A portion of the tube sheet 100 of a steam generator contacting primary cooling water and secondary cooling water is oxidized to be easily corroded and dented. Therefore, the tube bursts, such that activated primary cooling water flows to the outside of the tube 200 to thereby be discharged to the outside of the steam generator together with the secondary cooling water. Therefore, the surfaces of the tube sheet 100 of a steam generator contacting the primary cooling water and the secondary cooling water are cladded with the anticorrosive metal 20, thereby making it possible to prevent corrosion of the tube sheet 100 of a steam generator.

An existing technology (Korean Patent Laid-Open Publication No. 2005-0007950) has disclosed a configuration of reinforcement-welding up to an inner portion of the tube sheet. By contrast, the present invention has a configuration in which only the primary tube sheet surface 11 and the secondary tube sheet surface 12 are cladded with the anticorrosive metal 20, such that a manufacturing time is decreased and a manufacturing process is easy, as compared to the related technology. The anticorrosive metal 20 cladded on the secondary tube sheet surface forms an anticorrosive layer having an anticorrosive surface 12' disposed on the secondary side, as shown in FIG. 2.

The anticorrosive metal 20 may be a metal or an alloy having a corrosion speed lower than that of a material of the tube sheet 100 of a steam generator, preferably, include at least any one of stainless steel (STS), Alloy 600, and Alloy 690.

However, since an internal crack may be generated in a cladding layer or an interface between the cladding layer and the tube sheet due to stress in the cladding process to cause a decrease in a lifespan of the tube sheet 100, the manufacturing method of the tube sheet 100 of a steam generator according to the exemplary embodiment of the present invention may further include heat-treating the tube sheet 100 of a steam generator cladded with the anticorrosive metal 20 to improve toughness and corrosion resistance of the tube sheet. Here, as the heat-treating, frame heat treatment, electrical resistance heat treatment, high frequency heat treatment, or laser heat treatment may be performed.

Preferably, the heat-treating is performed at a temperature of 600 to 820° C. for 10 to 60 minutes. In the case in which a heat treatment temperature is less than 600° C., residual stress at a cladded portion is not sufficiently removed, and in the case in which the heat treatment temperature excesses 820° C., tensile strength and hardness are decreased, such that an inappropriate precipitate may be formed.

In the heat-treating, the entire tube sheet 100 of a steam generator may be heat-treated. Alternatively, the primary tube sheet surface 11 and the secondary tube sheet surface 12 are cladded with the anticorrosive metal 20, which are portions on which stress is concentrated, or only the secondary tube sheet surface 12 may be heat-treated to decrease a manufacturing cost. The tube sheet 100 of a steam generator cladded with the anticorrosive metal 20 is heat-treated, such that the residual stress due to the cladding process is removed. Therefore, toughness and corrosion resistance of the primary tube sheet surface 11 and the secondary tube sheet surface 12 on which the stress is concentrated are improved, thereby making it possible to manufacture the tube sheet 100 having an improved durability lifespan.

Figure 4:
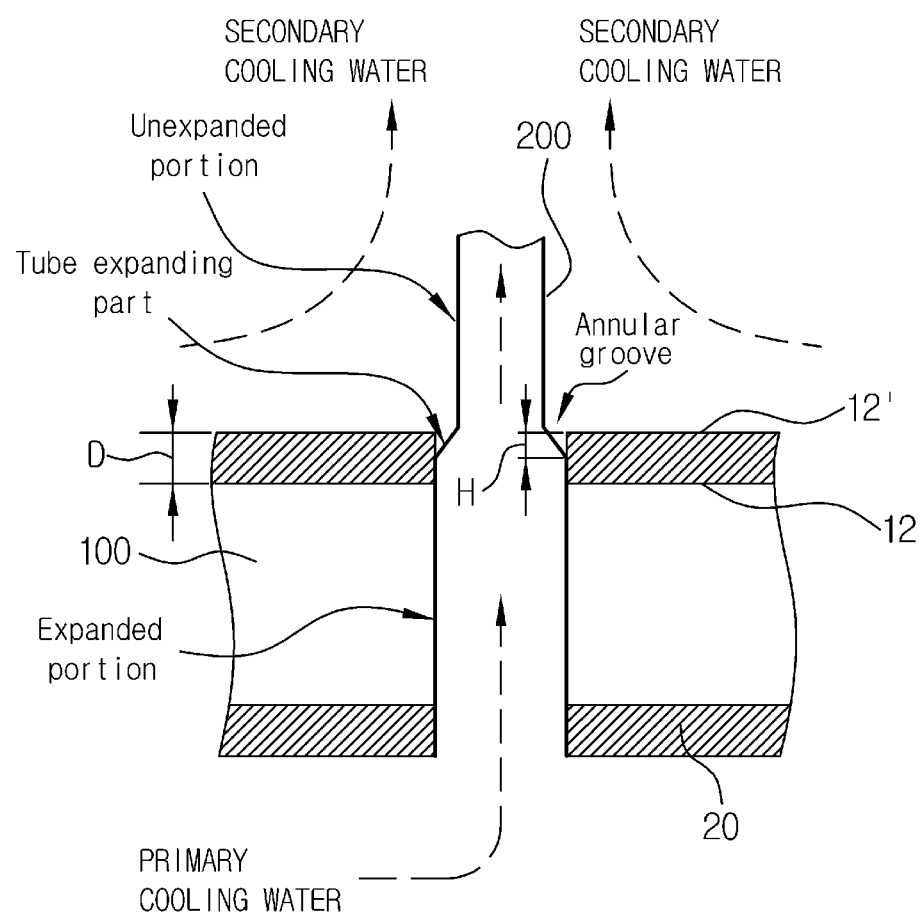
FIG. 4 is a cross-sectional view showing a tube sheet of a steam generator in which a tube is mounted, taken along the line A-A' of FIG. 3.

When the heat-treating of the tube sheet 100 of a steam generator is completed, the drilling of the tube mounting hole 30 in the tube sheet 100 of a steam generator that is subjected to the cladding and the heat-treating is performed. Referring to FIGS. 2 and 4, in the drilling, the tube sheet 100 is drilled so that the primary cooling water flows in the tube 200. The drilling may be manually performed. However, preferably, the drilling may be performed by inputting a diameter, an interval, and the like, of the tube mounting holes 30 in a preset program and then operating a drilling machine (not shown) according to the preset input value.

The drilling is performed after the cladding and the heat-treating and is performed once rather than twice, such that straightness of the tube mounting hole 30 is improved and a dimension tolerance of the tube mounting hole 30 is decreased, as compared to the existing technology (Korean Patent Laid-Open Publication No. 2005-0007950). In addition, a manufacturing time and a manufacturing cost significantly decreases.

As shown in FIG. 4, the tube mounting hole 30 is formed to have a diameter larger than the outer diameter of the tube 200, such that the tube 200 may be easily inserted into the tube mounting hole 30. After the tube 200 is inserted into the tube mounting hole 30, pressure is injected to a lower portion of the tube 200 to expand the lower portion of the tube 200 and form an expanded portion, thereby mounting the tube 200 in the tube sheet 100 at the expanded portion thereof. In this case, as shown in FIG. 4, a tube expanding part is formed between the expanded portion and the remaining unexpanded portion. That is, the diameter of the tube is increasing at the tube expanding part. According to one embodiment of the present invention, after expansion, an annular groove is formed around the tube expanding part, i.e., between the inner surface of the tube mounting hole and the outer surface of the tube expanding part. The annular groove has a depth H measured from the anticorrosive surface 12'. In this case, the anticorrosive metal (anticorrosive layer) cladding the secondary tube sheet surface is formed to have a thickness D equal to or larger than the depth H of the annular groove, thereby making it possible to prevent a corrosion acceleration phenomenon due to concentration of impurities in the annular groove since the anticorrosive layer (metal) is exposed to the annular groove. Since the depth H of the annular groove generally has a depth of 6.35 mm, it is preferable that the anticorrosive metal (layer) cladding the secondary tube sheet surface is formed to have a thickness D of 7 to 20 mm.

In addition, the manufacturing method of the tube sheet 100 of a steam generator according to the exemplary embodiment of the present invention further includes, after the drilling, polishing the secondary tube sheet surface 12 having the tube mounting hole 30 formed therein to planarize the secondary tube sheet surface 12. After the drilling, the polishing is performed to make the anticorrosive surface 12' uniform and decrease roughness of the anticorrosive surface 12', thereby making it possible to prevent the tube 200 from being damaged and prevent sludge 40 from being attached onto the secondary anticorrosive surface 12'.

More preferably, the manufacturing method of the tube sheet 100 of a steam generator according to the exemplary embodiment of the present invention may further include, between the heat-treating and the drilling, polishing the anticorrosive surface 12' in which the tube mounting hole 30 is to be formed. the anticorrosive surface 12' is polished before the drilling, such that roughness of the anticorrosive surface 12'—decreases, thereby making it possible to minimize the attachment of the sludge 40 and easily clean the sludge 40.

Example

Figure 5:
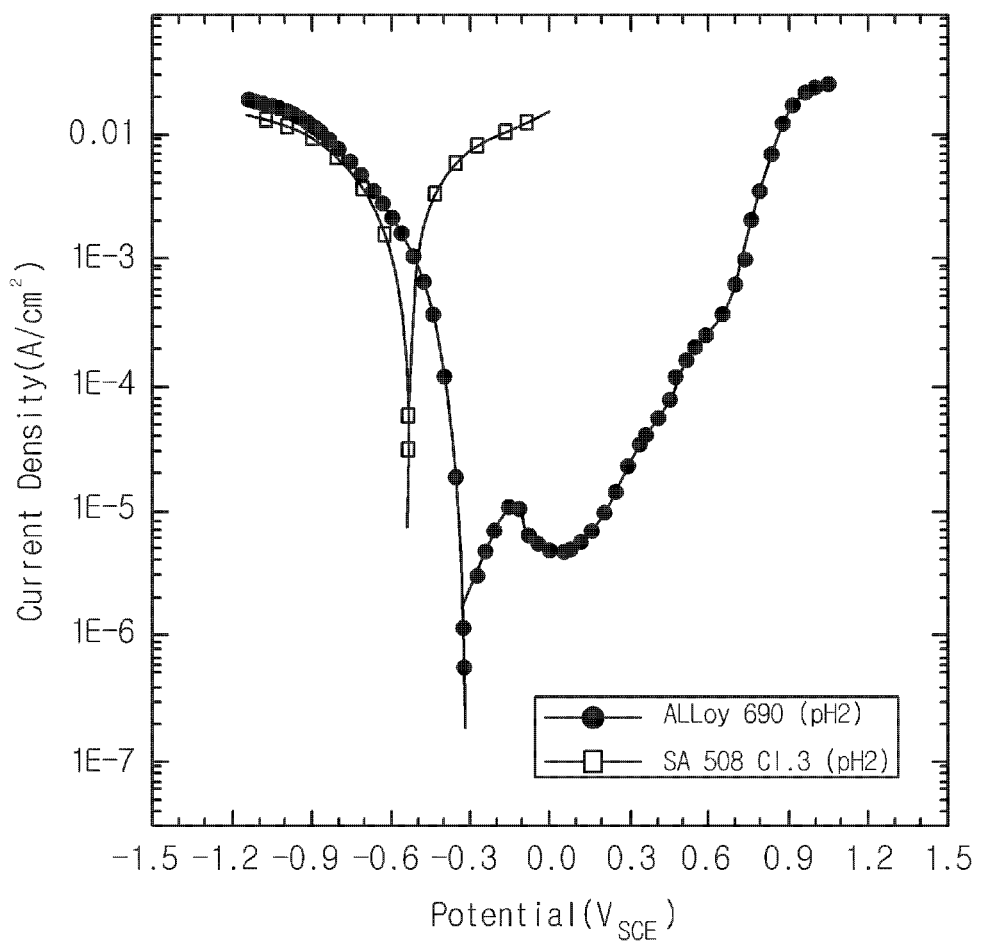
FIG. 5 is a graph comparing electrochemical corrosion rates of Alloy 690 and SA508C1.3 with each other in the case in which pH of a test solution is 2.
Figure 6:
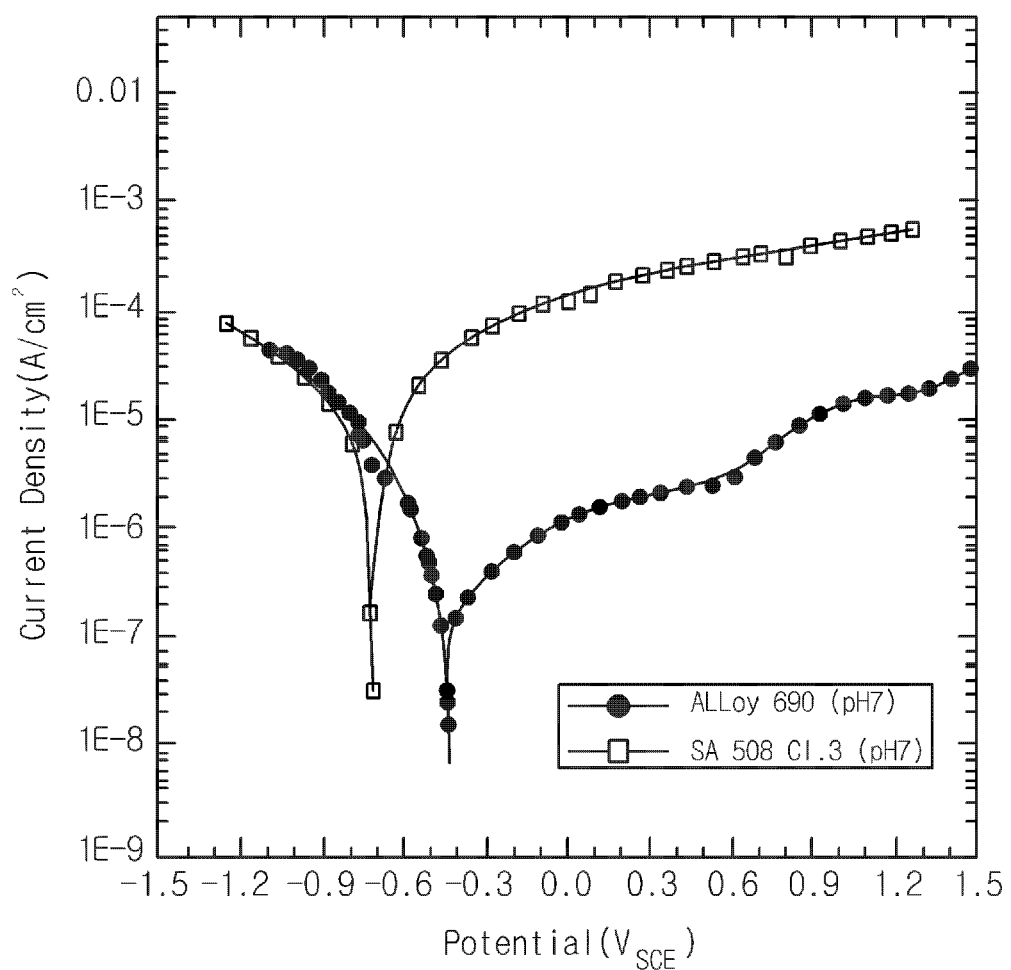
FIG. 6 is a graph comparing electrochemical corrosion rates of Alloy 690 and SA508C1.3 with each other in the case in which pH of a test solution is 7.
Figure 7:
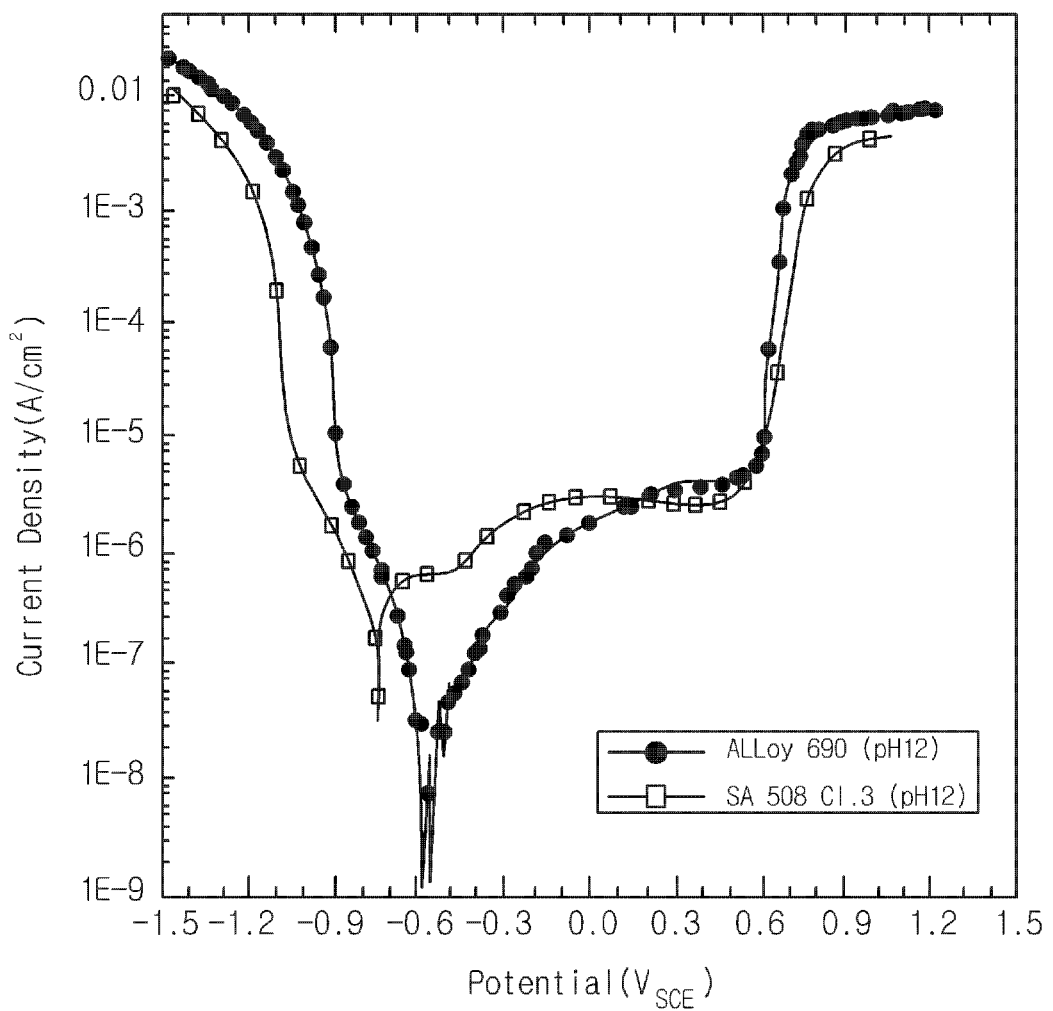
FIG. 7 is a graph comparing electrochemical corrosion rates of Alloy 690 and SA508C1.3 with each other in the case in which pH of a test solution is 12.

FIGS. 5 to 7 show test results of comparing electrochemical corrosion rates according to a change in pH with each other with respect to Alloy 690, which is a kind of anticorrosive metal 20 used for cladding, and SA508C1.3, which a material of an existing tube sheet 100. FIG. 5 is a graph comparing electrochemical corrosion rates of Alloy 690 and SA508C1.3 with each other in the case in which pH of a test solution is 2; FIG. 6 is a graph comparing electrochemical corrosion rates of Alloy 690 and SA508C1.3 with each other in the case in which pH of a test solution is 7; and FIG. 7 is a graph comparing electrochemical corrosion rates of Alloy 690 and SA508C1.3 with each other in the case in which pH of a test solution is 12.

Referring to FIG. 5, in the case in which pH of a test solution is 2, the electrochemical corrosion rate of Alloy 690 has decreased to 1/145 as compared with that of SA508C1.3, which a material of the existing tube sheet 100. Referring to FIG. 6, in the case in which pH of a test solution is 7, the electrochemical corrosion rate of Alloy 690 has decreased to 1/18 as compared with that of SA508C1.3, which a material of the existing tube sheet 100. Referring to FIG. 7, in the case in which pH of a test solution is 14, the electrochemical corrosion rate of Alloy 690 has decreased to 1/16 as compared with that of SA508C1.3, which a material of the existing tube sheet 100.

Further, it is shown that in all ranges of acid, neutrality, and base, a corrosion potential of an Alloy 690 material is high and a cathodic polarization curve thereof intersect with an anodic polarization curve of SA508C1.3. Therefore, it could be appreciated that the material of the existing tube sheet 100 contacts Alloy 690, which is the material of the tube 200, in the tube expanding part, such that corrosion acceleration by a galvanic effect occurs.

Figure 8:
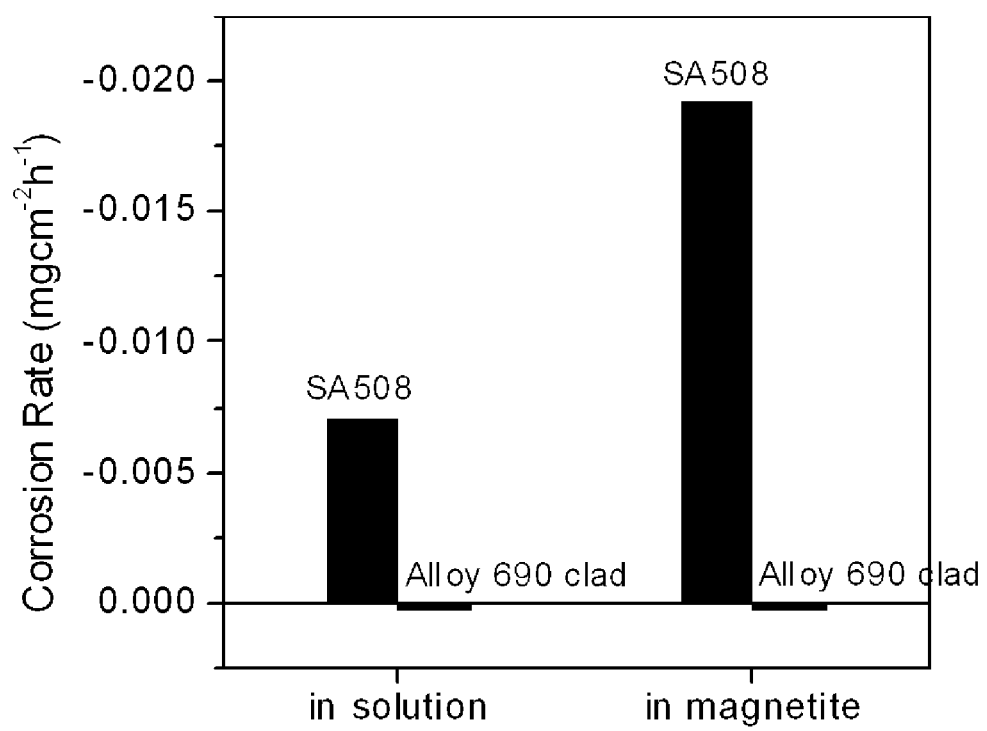
FIG. 8 is a graph showing corrosion rates of Alloy 690 and SA508 in a 2 mol of NaOH solution at a temperature of 315° C.

As shown in FIG. 8, under a condition in contact with a solution and magnetite, both of SA508 tube sheet materials according to the related art have shown a weight decrease, and an Alloy 690 cladding materials have shown a slight weight increase. A corrosion rate of SA508 exposed only to a solution was 0.00701 mg/cm$^2$h; however, a corrosion rate of the Alloy 690 cladding material was a low value of 0.00024 mg/cm$^2$h. Under a condition in which each of SA508 and the Alloy 690 cladding material are positioned in magnetite, a corrosion rate of SA508 was 0.01914 mg/cm$^2$h; however, a corrosion rate of the Alloy 690 cladding material was decreased to a very low value of 0.00033 mg/cm$^2$h. Therefore, corrosion resistance of the tube sheet has become about 30 to 60 times higher by the Alloy 690 cladding.

Figure 9:
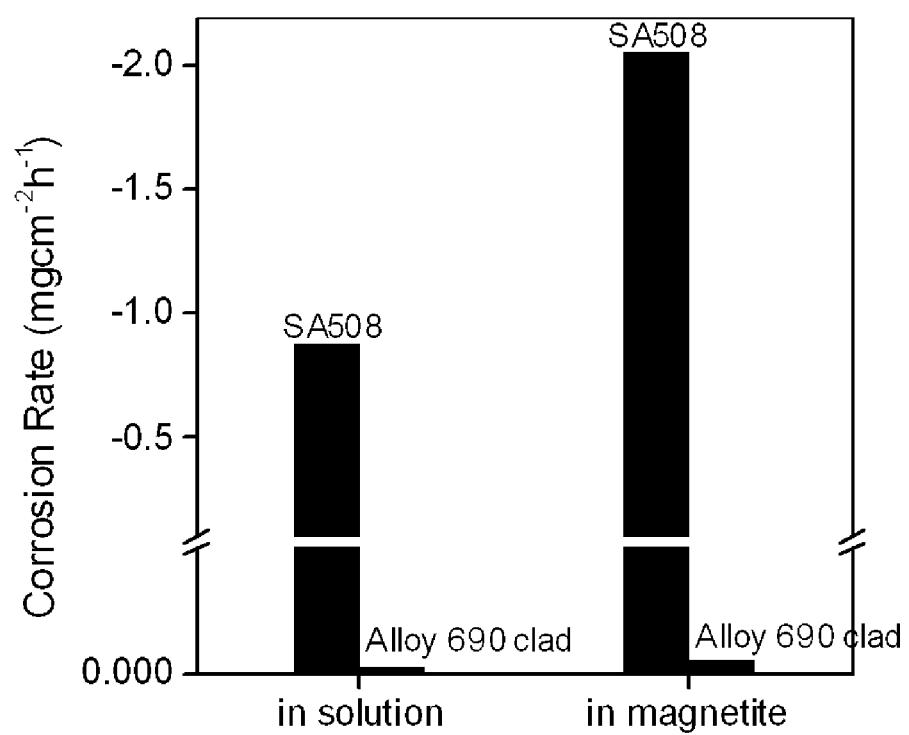
FIG. 9 is a graph showing corrosion rates of Alloy 690 and SA508 in a 0.1 mol of $NiCl_2$ solution at a temperature of 300° C.

As shown in FIG. 9, in both of two test materials, weight has decreased under a condition in contact with a solution and magnetite. A corrosion rate of SA508, which is an existing tube sheet base material, exposed only to a solution was 0.87330 mg/cm$^2$h; however, a corrosion rate of the Alloy 690 cladding material was a low value of 0.00163 mg/cm$^2$h. Under a condition in which each of SA508 and the Alloy 690 cladding material are positioned in magnetite, a corrosion rate of SA508 was 2.06200 mg/cm$^2$h; however, a corrosion rate of the Alloy 690 cladding material was rapidly decreased to 0.00303 mg/cm$^2$h. That is, corrosion resistance of the tube sheet has become about 540 to 680 times higher by the Alloy 690 cladding.

Therefore, it could be proved that the tube sheet according to the exemplary embodiment of the present invention effectively prevent denting even in a severe basic environment and an acidic environment of 300 to 315° C. even in which it is covered with magnetite.

Therefore, it could be proved that denting according to the exemplary embodiment of the present invention be effectively prevented by Alloy 690 cladding even in a severe basic environment and an acidic environment of 300 to 315° C. even in which it is covered with magnetite.

According to the exemplary embodiment of the present invention, the secondary tube sheet surface as well as the primary tube sheet surface is cladded with the anticorrosive metal to suppress the corrosion of the secondary tube sheet surface and prevent a stress corrosion crack of the tube, thereby making it possible to significantly improve soundness of the steam generator.

In addition, the manufacturing method of a tube sheet of a steam generator according to the exemplary embodiment of the present invention further includes heat-treating the tube sheet after the cladding, thereby making it possible to minimize processing deformation due to a cladding process.

Further, the manufacturing method of a tube sheet of a steam generator according to the exemplary embodiment of the present invention includes polishing the tube sheet before or after the drilling, thereby making it possible to minimize attachment of the sludge.

Moreover, according to the exemplary embodiment of the present invention, the tube mounting hole is formed by performing a drilling process once after the cladding, thereby making it possible to improve straightness of the tube mounting hole, decrease a processing dimension tolerance of the tube mounting hole, and significantly decrease a manufacturing time and a manufacturing cost.

Furthermore, according to the exemplary embodiment of the present invention, the primary tube sheet surface and the secondary tube sheet surface rather than an inner portion of the tube sheet are cladded with the anticorrosive metal, thereby making it possible to decrease a manufacturing time and simplify a manufacturing process.

The present invention is not limited to the above-mentioned specific exemplary embodiment and modified example, but may be variously modified by those skilled in the art to which the present invention pertains without departing from the gist of the present invention as defined by the following claims. In addition, these modifications are to fall within the scope of the following claims.

What is claimed is:

1. A tube sheet of a steam generator having an anticorrosive layer, the tube sheet comprising:
   a tube sheet of a steam generator having a primary tube sheet surface and a secondary tube sheet surface;
   an anticorrosive metal cladded on the secondary tube sheet surface, the anticorrosive metal forming an anticorrosive layer having a thickness D and having an anticorrosive surface;
   a tube mounting hole formed through the tube sheet and the anticorrosive layer, the tube mounting hole have an inner diameter, a primary side inlet and a secondary side outlet; and
   a tube having an outer diameter smaller than the inner diameter of the tube mounting hole, wherein one end portion of the tube is expanded to form an expanded portion, which is fitted into the tube mounting hole, a tube expanding part being formed between the expanded portion and a remaining unexpanded portion of the tube,
   wherein the expanded portion is fitted into the tube mounting hole so as to form an annular groove at the secondary side outlet by the tube expanding part, the annular groove having a depth H measured from the anticorrosive surface, and
   wherein the depth H is equal to or smaller than the thickness D.

2. The tube sheet of claim 1, wherein the anticorrosive metal is a metal or an alloy having a corrosion rate lower than that of the tube sheet of the steam generator.

3. The tube sheet of claim 1, wherein the anticorrosive metal includes at least one of stainless steel, Alloy 600 and Alloy 690.

4. A manufacturing method of a tube sheet of a steam generator having an anticorrosive layer and installed to support a tube of the steam generator, the manufacturing method comprising:
   cladding a secondary tube sheet surface of a tube sheet with an anticorrosive metal to form a cladded tube sheet, the anticorrosive metal having a thickness D and having an anticorrosive surface;
   heat-treating the cladded tube sheet to form a heat-treated tube sheet;
   drilling a tube mounting hole in the heat-treated tube sheet,
   inserting an end portion of a tube into the tube mounting hole, wherein the tube has an outer diameter smaller than an inner diameter of the tube mounting hole;
   expanding the end portion of the tube to form an expanded portion, which is fitted into the tube mounting hole, wherein a tube expanding part is formed between the expanded portion and a remaining unexpanded portion of the tube,
   wherein the end portion of the tube is expanded and fitted into the tube mounting hole so as to form an annular groove at a secondary side outlet of the tube mounting hole around the tube expanding part, the annular groove having a depth H measured from the anticorrosive surface, and the depth H is equal to or smaller than the thickness D.

5. The manufacturing method of claim 4, further comprising, before the drilling, polishing the anticorrosive surface.

6. The manufacturing method of claim 4, further comprising, after the drilling, polishing the anticorrosive surface.

7. The manufacturing method of claim 4, wherein the anticorrosive metal is a metal or an alloy having a corrosion rate lower than that of the tube sheet of the steam generator.

8. The manufacturing method of claim 4, wherein the anticorrosive metal includes at least one of stainless steel, Alloy 600 and Alloy 690.

9. The manufacturing method of claim 4, wherein in the heat-treating, the cladded tube sheet is heat treated at a temperature of 600 r to 820° C. for 10 to 60 minutes.

* * * * *